United States Patent
Lorenz

(10) Patent No.: US 12,297,873 B2
(45) Date of Patent: May 13, 2025

(54) TORQUE-DISTRIBUTION DEVICE FOR A MOTOR VEHICLE COMPRISING TWO PRESSURE-MEDIUM-ACTUATED CLUTCHES HAVING DOUBLE PISTONS, AND METHOD FOR OPERATING THE TORQUE-DISTRIBUTION DEVICE

(71) Applicant: Schaeffler Technologies AG & Co. KG, Herzogenaurach (DE)

(72) Inventor: Elmar Lorenz, Rheinmünster Söllingen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/695,018

(22) PCT Filed: Sep. 14, 2022

(86) PCT No.: PCT/DE2022/100681
§ 371 (c)(1),
(2) Date: Mar. 25, 2024

(87) PCT Pub. No.: WO2023/057006
PCT Pub. Date: Apr. 13, 2023

(65) Prior Publication Data
US 2024/0392842 A1    Nov. 28, 2024

(30) Foreign Application Priority Data
Oct. 8, 2021   (DE) .................... 10 2021 126 110.4

(51) Int. Cl.
F16D 13/52    (2006.01)
F16D 25/0638    (2006.01)
(Continued)

(52) U.S. Cl.
CPC ......... *F16D 25/0638* (2013.01); *F16D 25/10* (2013.01); *F16D 25/12* (2013.01)

(58) Field of Classification Search
CPC ...... F16D 13/52; F16D 25/0638; F16D 25/10; B60K 6/387
See application file for complete search history.

(56) References Cited

U.S. PATENT DOCUMENTS 5,511,644 A * 4/1996 Murata .................... F16D 13/52
192/85.41
5,701,976 A * 12/1997 Kumagai ................ F16D 55/40
192/85.33
(Continued)

FOREIGN PATENT DOCUMENTS

DE          10146606 A1    4/2003
DE     102012222472 A1    6/2013
(Continued)

*Primary Examiner* — Stacey A Fluhart

(57) ABSTRACT

A torque-distribution device includes a rotor carrier couplable to an input shaft, a clutch device having a disc pack, and an actuation device for actuating the clutch device. The actuation device includes a primary piston, and a secondary piston. The primary piston delimits a primary pressure chamber and is movable against the disc pack when pressure is applied to the primary pressure chamber. The secondary piston delimits a secondary pressure chamber and is movable to move the primary piston against the disc pack when pressure is applied to the secondary pressure chamber. Pressure medium arranged in the primary pressure chamber is supplied by a first feed line and pressure medium arranged in the secondary pressure chamber is supplied by a second feed line, independent of the first feed line, such that pressure can be applied to the primary piston and to the secondary piston independently.

15 Claims, 4 Drawing Sheets

(51) Int. Cl.
  *F16D 25/10*    (2006.01)
  *F16D 25/12*    (2006.01)

(56) References Cited

U.S. PATENT DOCUMENTS

| | | | | |
|---|---|---|---|---|
| 5,950,787 | A * | 9/1999 | Murasugi | F16H 63/3026 |
| | | | | 192/85.25 |
| 10,563,707 | B2 | 2/2020 | Park | |
| 2005/0284724 | A1 | 12/2005 | Hagenow | |
| 2009/0306867 | A1 | 12/2009 | Nagashima et al. | |
| 2019/0178305 | A1* | 6/2019 | Chae | F16H 61/688 |
| 2019/0186559 | A1* | 6/2019 | Shin | F16D 25/0638 |
| 2021/0379982 | A1* | 12/2021 | Omote | B60K 6/48 |

FOREIGN PATENT DOCUMENTS

| | | |
|---|---|---|
| DE | 102014102842 A1 | 9/2015 |
| DE | 102018130326 A1 | 3/2020 |
| DE | 102021117891 B3 | 8/2022 |
| DE | 102021117892 A1 | 1/2023 |
| DE | 102021126114 A1 | 4/2023 |
| JP | H05340430 A | 12/1993 |
| JP | 2016169759 A | 9/2016 |
| JP | 2017180730 A | 10/2017 |

* cited by examiner

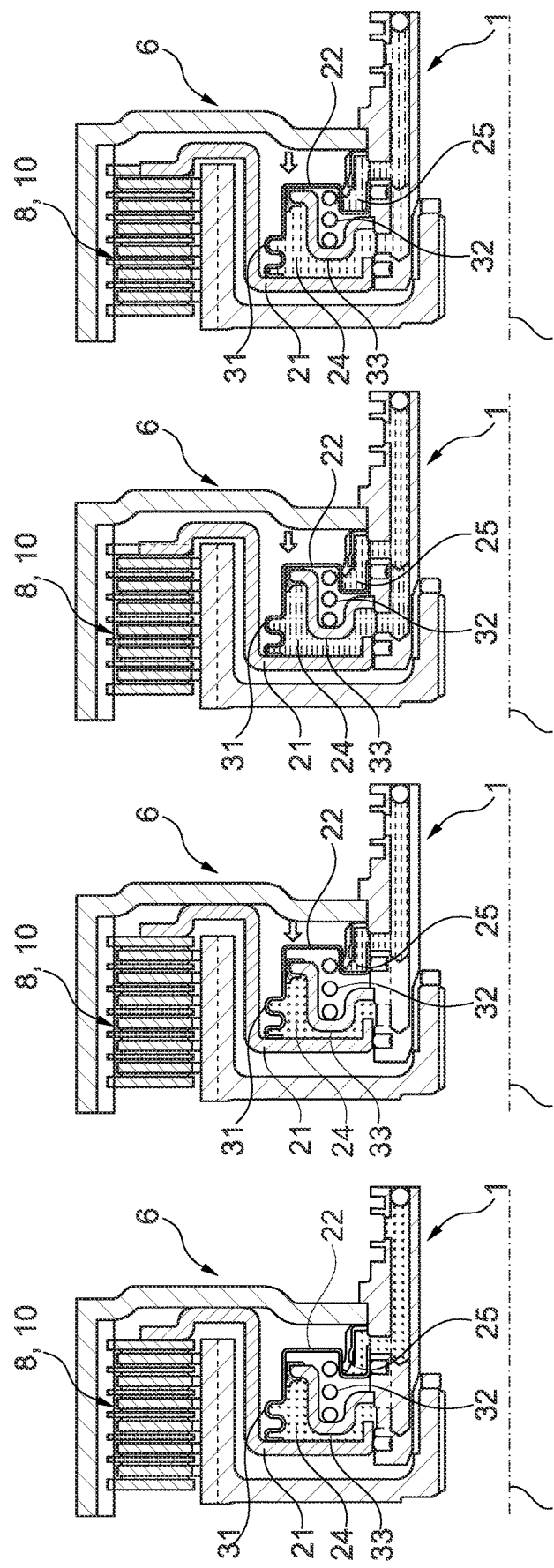

TORQUE-DISTRIBUTION DEVICE FOR A MOTOR VEHICLE COMPRISING TWO PRESSURE-MEDIUM-ACTUATED CLUTCHES HAVING DOUBLE PISTONS, AND METHOD FOR OPERATING THE TORQUE-DISTRIBUTION DEVICE

CROSS-REFERENCE TO RELATED APPLICATIONS

This application is the United States National Phase of PCT Appln. No. PCT/DE22/100681 filed Sep. 14, 2022, which claims priority to German Application No. DE102021126110.4 filed Oct. 8, 2021, the entire disclosures of which are incorporated by reference herein.

TECHNICAL FIELD

The present disclosure relates to a torque-distribution device having a rotor carrier that is coupled or can be coupled to a shaft introducing the torque, and two separate clutch devices, each designed as a multiple disc clutch.

BACKGROUND

Such a torque-distribution device is used in motor vehicles and serves to selectively distribute a torque introduced at a component of the torque-distribution device to two separate output shafts. Such a torque-distribution device is also often referred to as a "torque vectoring module". Its function is based on the fact that the rotor carrier, which forms a type of housing, is coupled to the introducing shaft, which can also be referred to as the drive or input shaft, so that torque can be introduced into the torque-distribution device.

Such a torque-distribution device is known from U.S. Pat. No. 10,563,707 B2. In this torque-distribution device, two separately actuable clutch devices are provided, which are designed as multiple disc clutches. The clutch devices are connected to the rotor carrier on the one hand and coupled to separate output shafts via separate inner multiple disc carriers on the other. The two selectively actuable clutch devices can be used to selectively supply the introduced torque to one, the other or both output shafts, in particular in a variable ratio. The system from U.S. Pat. No. 10,563,707 B2 comprises a first and a second pressure piston, wherein the second pressure piston runs against the disc pack and the first pressure piston runs against the second pressure piston. The movement of the pressure pistons is made possible by the fact that they each delimit a pressure chamber, which can be supplied with a pressure medium via a common feed line. Such a system is also referred to as a "tandem arrangement".

SUMMARY

The present disclosure provides a concept for a torque-distribution device that is improved in comparison.

According to the disclosure, for the torque-distribution device of the type mentioned at the outset, the primary pressure chamber and the secondary pressure chamber can each be supplied with a pressure medium in each case via separate feed lines and independently of one another, and thus pressure can be applied to the primary piston and the secondary piston independently of one another.

Independent supply of the pressure chambers enables additional operating and control situations of the torque-distribution device compared to systems known from the prior art. In the present disclosure, it is possible to adjust the pressure ratios in the pressure chambers independently of one another and independently of the current piston positions due to the separate feed lines. For example, it is possible for pressure to be applied to only one of the two pressure chambers if this is appropriate in a given situation. For example, this allows the pistons to be transferred as quickly as possible from one switching position to another, particularly in connection with overcoming a so-called release clearance, which is discussed in detail further down below. Just as the application of pressure can be controlled separately, the reduction of pressure in the two pressure chambers can of course also be controlled separately and independently of one another, so that individual, situation-dependent control is also possible in connection with the opening of the clutch device.

In order to seal the primary pressure chamber and the secondary pressure chamber with respect to the axial movement of the primary piston and the secondary piston along the retaining element, the pistons can each slide on a sealing element, e.g., a stationary sealing element arranged on the retaining element, which can be a sealing ring.

In the torque-distribution device according to the disclosure, the primary pressure chamber may have a larger filling volume for the pressure medium than the secondary pressure chamber and/or a primary piston pressure area of the primary piston delimiting the primary pressure chamber may be larger than a secondary piston pressure area of the secondary piston delimiting the secondary pressure chamber. The filling volume refers, for example, to the maximum filling volume of the respective pressure chamber. These different designs of the pressure chambers make it possible to transfer the secondary piston between corresponding positions more quickly than with the primary pressure chamber due to the fact that less pressure medium has to be introduced into the secondary pressure chamber for this purpose. If the pressure chambers have the same filling volume and only the piston pressure areas are different, this also means that the additional introduction of a certain volume of pressure medium into the pressure chambers causes a greater speed of the secondary piston and thus a faster adjustment.

By way of example, this is explained below in the context of overcoming the aforementioned release clearance, i.e., overcoming a distance between the disc pack and the primary piston, which must be achieved by a piston movement of the primary piston when the clutch device is transferred from a release position to a sensing position. The release position refers to the operating state of the clutch device in which the disc packs are not in frictional contact. The sensing position refers to the operating state of the clutch device in which the disc packs are in frictional contact, e.g., in frictional engagement. Thus, in the present disclosure, the pressure force causing the friction between the disc packs may be generated mainly or exclusively by means of the primary pressure chamber. In this embodiment, the secondary pressure chamber can be provided mainly or exclusively for the purpose of transferring the primary piston very quickly into contact with the disc pack by means of the secondary piston. i.e., to overcome the release clearance and transfer the primary piston to the sensing position. Lower forces are required for this transfer than for generating the friction between the disc packs. Accordingly, a smaller filling volume or a smaller pressure area of the secondary pressure chamber or secondary piston is sufficient for this purpose. As the secondary pressure chamber can be filled with the pressure medium or pressure can be applied correspondingly faster, the release clearance is overcome faster than in the case where the pressure chambers would have the same filling volumes or the pistons would have the same pressure areas. This allows for a low-hysteresis switching behavior of the torque-distribution device with lower delays, as the primary piston can practically be pilot-controlled via the secondary piston.

In the torque-distribution device according to the disclosure, at least one pressure medium conveying device can be provided for feeding the pressure medium into the pressure chambers and for applying pressure to the pressure medium. The pressure medium conveying device can be or comprise a pump or a hydraulic device with corresponding hydraulic pistons. The pressure medium can be a hydraulic oil.

In this regard, the common pressure medium conveying device can be provided in a common feed line, wherein the separate feed lines branch off from the common feed line. Here, a valve device each for opening and closing the respective feed line is provided in the region of the separate feed lines. The pressure chambers are thus supplied with the pressure medium by means of a single pressure medium conveying device, wherein the valve devices, akin to the pressure medium conveying device, can be controlled by a control device. The valve devices can be operated only in an open or closed state or in several states between the open state and the closed state, e.g., in a stepless manner.

Alternatively, it is conceivable that a separate pressure medium conveying device is provided in each of the feed lines, which are fluidically independent of one another. In this regard, the two pressure medium conveying devices can be controlled separately by means of a control device.

In the torque-distribution device according to the disclosure, the primary piston and the secondary piston can be connected to one another via a first spring element. The first spring element further enhances the low-hysteresis control behavior of the clutch device. As such, the application of pressure to the pressure medium provided in the primary pressure chamber causes the primary piston to press against the disc pack, specifically against an elastic restoring force of the first spring element connected to the first primary piston, which in turn is connected to the secondary piston. For example, it is intended in this regard that the secondary piston is in a stop position, but that the primary piston continues to be pressed against the disc pack against the restoring force of the first spring element due to the pressure building up in the primary pressure chamber, which occurs against the restoring force of the spring element coupled to it. If the frictional engagement caused by this is to be canceled, it is sufficient to reduce the pressure in the primary pressure chamber, for example by opening a corresponding valve. The first spring element, which is still tensioned at this moment, causes the primary piston to move away from the disc pack without any time delay.

The secondary piston and the first spring element can be an integral component. This allows for the torque-distribution device to be less complex, e.g., with regard to the number of individual components of the clutch device and the associated manufacturing effort. As such, the secondary piston and the first spring element can be manufactured and assembled together, thus eliminating extra work steps. The integral component can be manufactured by deep drawing a sheet metal component. In addition, the integral design means that no separate connecting means are required to fasten the first spring element to the secondary piston. Furthermore, forces are transmitted from the secondary piston via the spring element to the primary piston in the course of overcoming the release clearance with virtually no loss, as no losses due to the otherwise required connecting means occur in this case.

The first spring element may be a bellows. A bellows is an elastic element that can be folded in an accordion-like manner and that can extend radially around the entire circumference with respect to an axis of rotation of the clutch device, so that a uniform force effect is realized by means of the bellows. In relation to the axial direction, the bellows may have a repeating cross-sectional structure, which can be U-shaped and/or Ω-shaped at least in sections. The restoring force that can be achieved by means of the bellows or the spring hardness of the spring element depends, for example, on the wall thickness of the bellows material. The bellows may be made of a metal with favorable mechanical properties, such as elasticity and durability. The bellows and the secondary piston can be formed from a single piece of metal sheet which is folded in an accordion-like manner in the region of the bellows. Alternatively, the bellows can be connected to the secondary piston in a materially bonding manner, for example by means of a welded connection.

If the first spring element is the bellows, the spring element may delimit the primary pressure chamber outwards in the radial direction. In this embodiment, the bellows is fluid-tight, and a corresponding fluid-tightness can also be automatically provided at the corresponding transition point due to the integral nature of the first spring element and the secondary piston, for example. The bellows is further fastened to the primary piston by means of a fluid-tight connection. In this embodiment, the bellows thus not only performs the function described above with regard to the restoring effect, but also serves to seal or delimit the primary pressure chamber.

In principle, the first spring element can also be or comprise at least one coil spring or a disc spring. These springs can also be made of metal and, for example, in the case of the disc spring, can be formed integrally, for example from the sheet metal with the secondary piston, or be welded on.

In the torque-distribution device according to the disclosure, a second spring element can be provided, which is supported on the one hand on a section which is stationary with respect to the axially displaceable pistons and on the other hand on the secondary piston. The second spring element can be or comprise a coil spring or a disc spring. When pressure is applied to the secondary pressure chamber, the secondary piston is displaced against an elastic restoring force of the second spring element, so that the secondary piston automatically moves away from the primary piston when pressure is no longer applied to the secondary pressure chamber. The hysteresis-free control behavior of the clutch device already mentioned above is therefore even further enhanced by the further spring element. The stationary section can be a support flange, which is discussed in detail further down below.

In the torque-distribution device according to the disclosure, the secondary piston can comprise a radial secondary piston section and an adjoining axial secondary piston section. The secondary piston is practically L-shaped when viewed in cross-section. The axial secondary piston section extends in a cylindrical shape, the radial secondary piston section extends in a disc-like shape, and the radial secondary piston section is arranged at a front end of the cylindrical axial secondary piston section. The secondary piston is thus closed, for example, at the end at which the radial secondary piston section is arranged and open at the opposite end. This open end of the secondary piston points in the direction of the primary piston and is fastened to it. The radial secondary piston section serves to form a support surface for a further spring element and a stop surface for the secondary piston running against the support flange, which is discussed in detail further down below.

The first spring element, e.g., the bellows, may be arranged at the end of the axial secondary piston section opposite the radial secondary piston section. In this embodiment, the first spring element ultimately forms an axial end section of the axial secondary piston section, which sits on the primary piston and is fastened to it. If the first spring element is the bellows, this creates a comparatively large ring-shaped contact surface between the first spring element and the primary piston, improving force transmission and, for example, fluid-tightness. Alternatively, the first spring element can form the axial secondary piston section. In this embodiment, the first spring element, e.g., the bellows, directly adjoins the radial secondary piston section.

The torque-distribution device according to the disclosure can have the support flange extending from the retaining element, e.g., in the radial direction, which extends between the primary piston and the secondary pistons. The support flange may delimit the primary pressure chamber, e.g., on the side opposite the secondary piston. The axial secondary piston section can engage around the support flange in such a way that the axial secondary piston section slides and is guided along the radial end of the support flange. In addition to the pure support function, a support flange sealing element can further be provided, which is arranged, for example, at a radial end of the support flange and which seals towards the axial secondary piston section in a fluid-tight manner, e.g., in order to seal the primary pressure chamber. The support flange sealing element can be a sealing ring arranged radially on the outside of the support flange, e.g., made of an elastomer. In this regard, the primary pressure chamber is delimited by the primary piston, the axial secondary piston section, e.g., the first spring element, and the support flange.

The effect of the first spring element with regard to the hysteresis-free control behavior of the torque-distribution device according to the disclosure can be realized by an axial running of the radial secondary piston section onto the support flange. Thus, when the clutch device is transferred from the release position to the sensing position, the secondary piston, specifically the disc-like radial secondary piston section, can reach a stop position in which it runs onto the support flange, and the primary piston is pressed even further against the disc pack and against the restoring force of the spring element coupled to it when the pressure in the primary pressure chamber increases further, which occurs against the restoring force of the spring element. In this embodiment, the required counterforce is provided by means of the support flange.

In an example embodiment of the clutch device according to the disclosure, the secondary pressure chamber is delimited by a secondary pressure chamber delimiting flange which is stationary with respect to the axially displaceable secondary piston and is fastened to the retaining element. The radial secondary piston section has an axially open annular groove delimiting the secondary pressure chamber, and the secondary pressure chamber delimiting flange engages axially in the annular groove and slides in a fluid-tight manner along a surface of the annular groove with a delimiting flange sealing element during the axial displacement of the secondary piston. The secondary pressure chamber delimiting flange can additionally or alternatively be fastened to the rotor carrier or housing of the torque-distribution device. The annular groove forms a central recess, as viewed radially, of the disc-shaped radial secondary piston section, and the secondary pressure chamber delimiting flange engages in the annular groove and slides along it in order to guide the axial movement of the secondary piston. The outer diameter of the axially open annular groove thus corresponds approximately to the outer diameter of the secondary pressure chamber delimiting flange. The secondary pressure chamber delimiting flange, which may be L-shaped in cross-section, can have a radial section that extends away from the retaining element in the radial direction in a disc-like manner. An axial section can be arranged on the radial section, by which the secondary pressure chamber delimiting flange engages in a cylinder-like manner in the axially open cylinder-like annular groove.

In this embodiment, the secondary pressure chamber can be delimited at one axial end by the annular groove of the secondary piston and at the other axial end by the secondary pressure chamber delimiting flange. With regard to the radial direction, the secondary pressure chamber is delimited both by an axial wall section of the annular groove and by the axial section of the secondary pressure chamber delimiting flange.

A delimiting flange sealing element can be provided on the secondary pressure chamber delimiting flange, e.g., at the open end of the axial section, which is accommodated in the annular groove and which seals the secondary pressure chamber to the outside in a fluid-tight manner. The delimiting flange sealing element can protrude radially beyond the secondary pressure chamber delimiting flange so that the required sealing effect is reliably achieved. The delimiting flange sealing element can be a sealing ring, e.g., made of an elastomer.

The secondary pressure chamber delimiting flange can additionally or alternatively be fastened to a rotor carrier of a torque-distribution device, which is discussed in detail further down below.

The present disclosure further relates to a method for operating a torque-distribution device according to the preceding description, wherein each of the multiple disc clutches is transferred from a release position, in which it is open, to a sensing position, in which it is closed, due to pressure being applied to the pressure medium arranged in the secondary pressure chamber before or at the same time as pressure is applied to the pressure medium arranged in the primary pressure chamber. All aspects, features and advantages of the method according to the disclosure are applicable to the torque-distribution device according to the disclosure and vice versa.

Starting from the release position, it is therefore intended that no pressure is applied to the pressure medium in the primary pressure chamber and the secondary pressure chamber. If a control signal is present that indicates a transfer of the torque-distribution device or the respective clutch device to the sensing position, pressure can be applied to the pressure medium arranged in the secondary pressure chamber, for example by controlling the corresponding pressure medium conveying device or valve device. This causes the secondary piston to be pressed directly against the primary piston, which in turn runs directly against the disc pack, so that the release clearance previously existing between the primary piston and the disc pack is quickly overcome. Pressure is then applied to the pressure medium arranged in the primary pressure chamber so that the final pressure force of the primary piston is generated on the disc pack, bringing it into frictional contact or frictional engagement. A similar effect occurs if the application of pressure to the pressure medium occurs simultaneously in the primary piston and the secondary piston.

In addition, it may be provided in the method according to the disclosure that each of the multiple disc clutches is transferred from the sensing position to the release position by relieving the pressure of the pressure medium arranged in the primary pressure chamber before or at the same time as relieving the pressure of the pressure medium arranged in the secondary pressure chamber. For example, if the first and/or second spring element is provided, an almost hysteresis-free control of the torque-distribution device for transferring it from the sensing position to the release position is achieved. Thus, the removal of the pressure in the primary pressure chamber directly results in a reduction in the pressure force of the primary piston on the disc pack, and, if the first spring element preloaded in this operating situation is provided, this causes the primary pressure chamber to be emptied immediately, so that the primary piston moves away from the disc pack without delay and the friction present between the disc packs is therefore eliminated. In addition, the pressure drop of the pressure medium in the secondary pressure chamber causes the second spring element to relax and the secondary piston, as it is connected to the primary piston, pulls the primary piston away from the disc pack.

BRIEF DESCRIPTION OF THE DRAWINGS

The present disclosure is explained below on the basis of exemplary embodiments with reference to the drawings. The drawings are schematic representations, in which.

DETAILED DESCRIPTION

Figure 1:
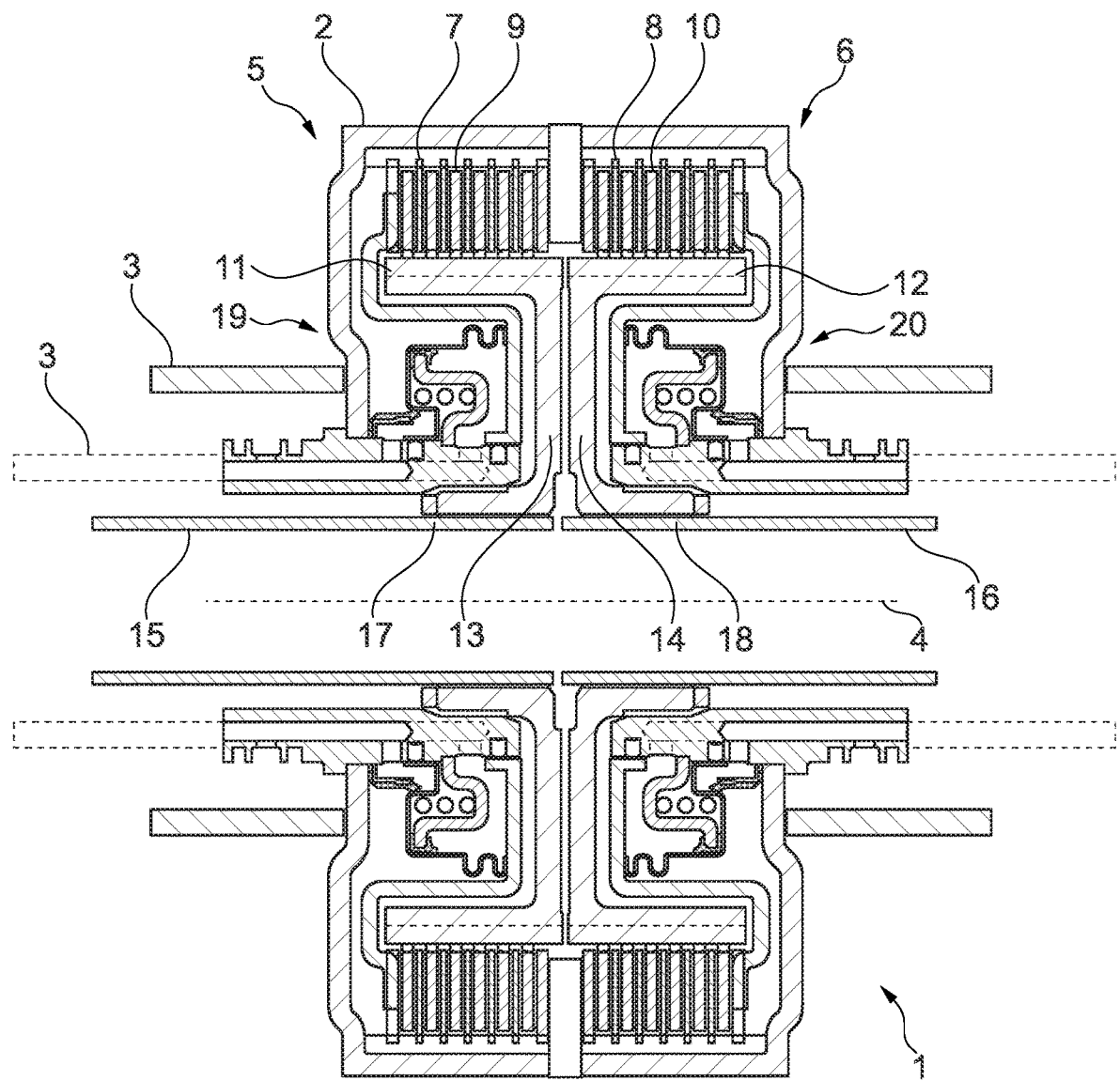
FIG. 1 shows a longitudinal section through an exemplary embodiment of a torque-distribution device according to the disclosure.
Figure 2:
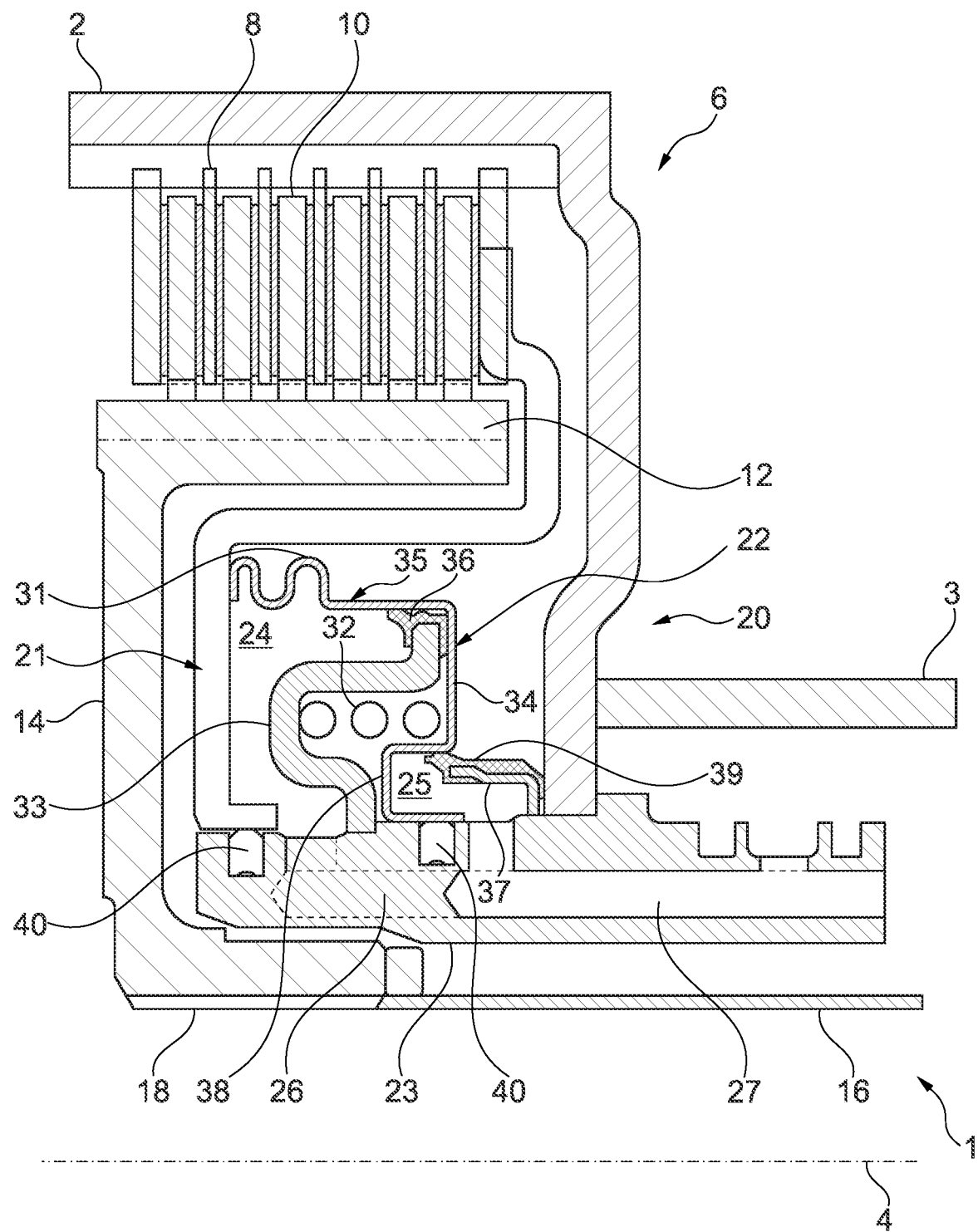
FIG. 2 shows an enlarged view of the upper right part of the torque-distribution device from FIG. 1, FIGS. 3-4 show different ways of feeding the pressure medium into the pressure chambers of the torque-distribution device shown in FIGS. 1 and 2, and FIGS. 5-8 show several states of the torque-distribution device from FIGS. 1 and 2 in order to explain the method according to the disclosure.

FIG. 1 shows a longitudinal section running along an axial direction through an exemplary embodiment of a torque-distribution device 1 according to the disclosure in a schematic diagram. FIG. 2 is an enlarged partial view of the upper right quarter of FIG. 1. The torque-distribution device 1 is part of a motor vehicle not shown in detail and is used to transmit the drive torque generated by a motor to the two wheels of a common axle according to an adjustable ratio.

The torque-distribution device 1 includes a rotor carrier 2 that is U-shaped as viewed in a longitudinal section, which, like almost all components of the torque-distribution device 1, is designed to be ring-shaped. The rotor carrier 2 is connected or can be connected to a torque-introducing shaft 3 or input shaft, for example by means of a welded connection. As indicated by the dashed line in FIG. 1, the shaft 3 can also be provided at other points on the torque-distribution device 1. In any case, the shaft 3 is coupled to the rotor carrier 2 so that the introduced torque is transmitted to the rotor carrier 2. The rotor carrier 2 and the shaft 3 are rotatably mounted about a rotation axis 4.

The torque-distribution device 1 also includes two separate clutch devices 5, 6, which are designed as multiple disc clutches. Each clutch device 5, 6 includes an axially displaceable outer disc pack 7, 8, which is connected in a non-rotatable manner to the rotor carrier 2 via a toothing connection. Each clutch device 5, 6 includes an axially displaceable inner disc pack 9, 10, each of which is coupled in a non-rotatable manner to an inner multiple disc carrier 11, 12 via a toothing connection and can be coupled or is coupled to a separate output shaft 15, 16 via a hub flange 13, 14. For this purpose, each hub flange 13, 14 has an axial toothing 17, 18, which meshes with an axially extending outer toothing of the respective output shaft 15, 16. The output shafts 15, 16, as well as the rotor carrier 2 together with the shaft 3, are mounted so that they can rotate about the rotation axis 4. The outer and inner disc packs 7, 9 and 8, 10 each engage in one another and form a common disc pack.

The clutch devices 5, 6 each includes a separate actuation device 19, 20, via which the respective clutch device 5, 6 can be actuated. The clutch devices 5, 6 or actuation devices 19, 20 can be controlled separately so that the torque introduced by means of the shaft 3 can be selectively guided from the rotor carrier 2 to the output shafts 15, 16.

In the following, details regarding the actuation device 20 are explained with reference to FIG. 2, in which the upper right section of the torque-distribution device 1 of FIG. 1 is shown enlarged. The aspects explained in this context apply equally to the mirrored actuation device 19 or clutch device 5.

The clutch device 6 or actuation device 20 includes a primary piston 21 and a secondary piston 22. A stationary retaining element 23 is provided on the rotor carrier 2, on which the pistons 21, 22 are arranged in an axially displaceable manner. The primary piston 21 rests with its radially outer end against the outer disc pack 8 or faces it, so that the outer disc pack 8 can be pressed axially against the inner disc pack 10 by means of the primary piston 21 in order to bring the disc packs 8, 10 into frictional contact or frictional engagement. Viewed radially inwards, the primary piston 21 has an annular groove-like section in which further components of the actuation device 20 or clutch device 6, which are discussed in detail further down below, are accommodated in order to achieve a space-saving design for the torque-distribution device 1.

A wall or section of the primary piston 21 delimits a primary pressure chamber 24. A pressure medium such as a hydraulic oil can be introduced into the primary pressure chamber 24 and pressurized, so that when pressure is applied to the pressure medium, the axial displacement previously described and thus the pressure effect of the primary piston 21 on the disc packs 8, 10 is effected.

The secondary piston 22 delimits a secondary pressure chamber 25, into which a pressure medium such as a hydraulic oil can also be introduced and pressurized. In the present exemplary embodiment, the secondary pressure chamber 25 serves to quickly overcome a release clearance, which is discussed in detail further down below.

In order to seal the primary pressure chamber 24 and the secondary pressure chamber 25 with respect to the axial movement of the primary piston 21 and the secondary piston 22 along the retaining element 23, the pistons 21, 22 each slide on a sealing element 40 arranged on the retaining element 23, which is in each case designed as a sealing ring.

In the torque-distribution device 1, it is provided that the primary pressure chamber 24 and the secondary pressure chamber 25 can each be supplied with a pressure medium in each case via separate feed lines 26, 27 and independently of one another. This has the effect that pressure can be applied to the pistons 24, 25 independently of one another and that these can thus be controlled separately both when the clutch is closed and when the clutch is opened, so that, generally speaking, additional operating and control situations as well as fast switching behavior of the torque-distribution device 1 can be realized.

Figure 3:
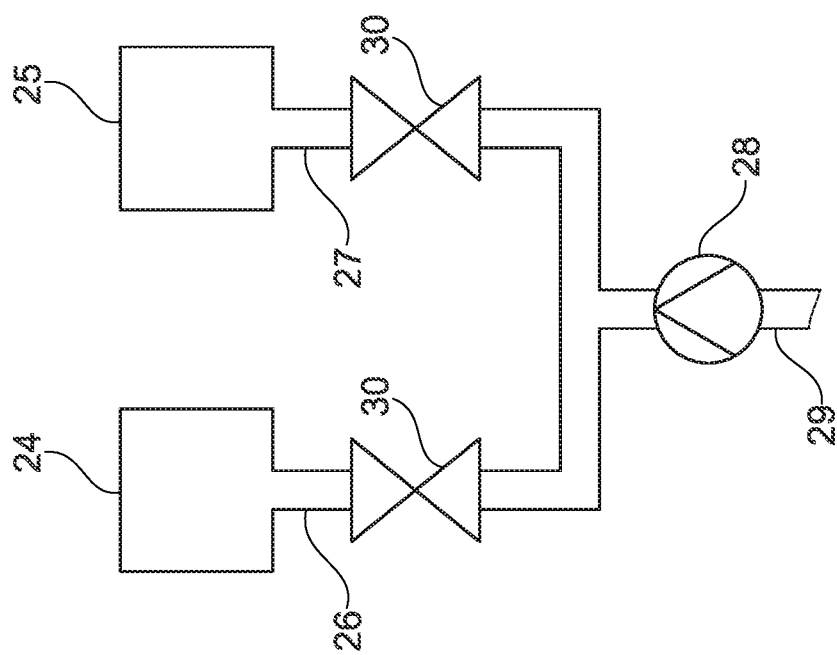

In the following, details regarding the independent application of pressure in the pressure chamber 24, 25 are explained with reference to FIGS. 3 and 4. As such, the primary pressure chamber 24 can be supplied with the respective pressure medium by means of a primary feed line 26 and the secondary pressure chamber 25 by means of a secondary feed line 27. In the situation shown in FIG. 3, a common pressure medium conveying device 28 is provided in a common feed line 29, which branches off into the separate feed lines 26, 27. In the region of each of the separate feed lines 26, 27, a valve device 30 is provided for separately opening and closing the respective feed line 26, 27. The valve devices 30 can be opened and closed in a stepless manner and can be controlled for this purpose by means of a control device not shown in detail.

Figure 4:
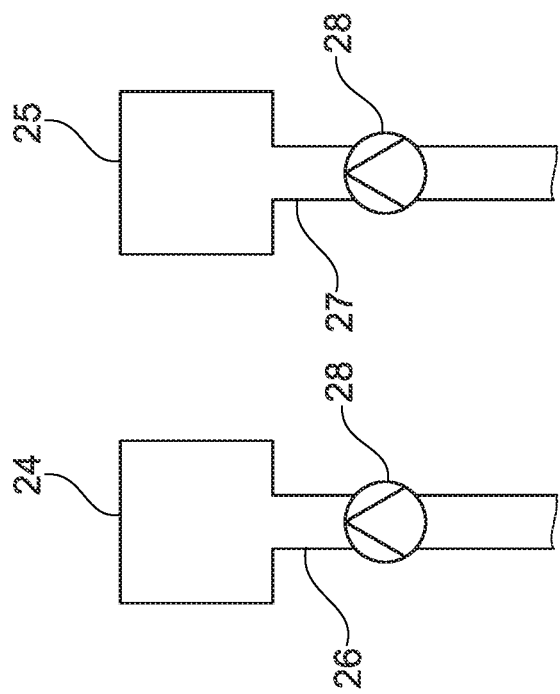

In the situation shown in FIG. 4, two separate pressure medium conveying devices 28 are provided, each in one of the feed lines 26, 27. In this regard, the feed lines 26, 27 are fluidically independent of one another, i.e., they are not coupled to one another by means of the common feed line 29.

In both cases, the pressure chambers 24, 25 can be supplied with the pressure medium independently of one another. The pressure medium conveying device 28 is provided in the form of a hydraulic device with a corresponding hydraulic piston, wherein further details in this regard are known to the person skilled in the art and are therefore not explained in more detail here. The pressure medium conveying device 28 can also be or comprise a pump.

Further details regarding the specific design of the torque-distribution device 1 are explained below with reference to FIGS. 1 and 2. As such, the filling volume of the primary pressure chamber 24 is evidently larger than the filling volume of the secondary pressure chamber 25. Furthermore, a primary piston pressure area of the primary piston 21 delimiting the primary pressure chamber 24 is larger than a secondary piston pressure area of the secondary piston 22 delimiting the secondary pressure chamber 25. The filling volume refers here to the respective maximum filling volume that is present when, with reference to FIG. 2, the primary piston 21 and the secondary piston 22 are each in the left stop position. These different designs of the pressure chambers 24, 25 make it possible to transfer the secondary piston 22 from the right stop position to the left stop position more quickly than with the primary pressure chamber 21 due to the fact that less pressure medium has to be introduced into the secondary pressure chamber 25 for this purpose, which improves the aforementioned rapid overcoming of the release clearance.

The primary piston 21 and the secondary piston 22 are coupled to one another via a first spring element 31, which in the present case is a bellows. The secondary piston 22 and the first spring element 31 are an integral component. By way of example, the integral component is an integral sheet metal part which forms both the first spring element 31 and the secondary piston 22. The bellows delimits the primary pressure chamber 24 outwards in the radial direction. The bellows is correspondingly designed to be fluid-tight and is fastened to the primary piston 21 by means of a fluid-tight connection. The bellows 27 is fastened to the primary piston 21, so that when the secondary piston 22 moves in a direction away from the primary piston 21, the primary piston 21 can also move the secondary piston away from the disc pack. Alternatively, the first spring element 31 can also be a coil spring or disc spring.

The clutch device 1 further has a second spring element 32, which is supported on the one hand on a stationary section, specifically a support flange 33, which is discussed below; and on the other hand on the secondary piston 22. In the present case, the second spring element 32 is a coil spring that extends around the rotation axis 4. Alternatively, the second spring element 32 can also be a disc spring.

The secondary piston 22 includes a radial, disc-like secondary piston section 34 and an axial, cylinder-like secondary piston section 35 adjoining it, and the first spring element 31 or the bellows is a component of the axial secondary piston section 35. Viewed in cross-section, the secondary piston 22 is L-shaped due to the sections 34, 35. The bellows is arranged at the end of the axial secondary piston section 35 opposite the radial secondary piston section 34. Alternatively, the first spring element 31 or the bellows can form the axial secondary piston section 35.

The retaining element 23 has the aforementioned support flange 33 extending in the radial direction, which extends between the primary piston 21 and the secondary piston 22. In this regard, the support flange 30 is engaged around by the cylindrical axial secondary piston section 35, so that the axial secondary piston section 35 slides along the radial end of the support flange 33. A support flange sealing element 36, in the present case a sealing ring made of an elastomer mounted on the support flange, is arranged at the radial end of the support flange 33 for fluid-tight sealing of the primary pressure chamber 24 towards the secondary piston 22 or the secondary piston section 35.

The secondary pressure chamber 25 is delimited by a secondary pressure chamber delimiting flange 37, which is L-shaped in cross-section and which is stationary with respect to the axially displaceable pistons 21, 22 as well as fastened to the retaining element 23. The radial secondary piston section 34 has an axially open annular groove 38 delimiting the secondary pressure chamber 25, into which the secondary pressure chamber delimiting flange 37 axially engages. During the axial displacement of the secondary piston 22, the secondary pressure chamber delimiting flange 37 slides along a surface of the annular groove 38. A delimiting flange sealing element 39 is provided in order to seal the secondary pressure chamber 25, which rests against the secondary piston in the annular groove 38. The delimiting flange sealing element 39 is also a sealing ring made of an elastomer.

As can be seen in particular from FIG. 2, the secondary pressure chamber delimiting flange 37 has a radial section in which it extends in a disc-like manner away from the retaining element 23 in the radial direction. The radial section is followed by a cylindrical axial section, by which the secondary pressure chamber delimiting flange 37 engages in the cylinder-like annular groove 38, which is also delimited radially outwards. The secondary pressure chamber 25 is delimited at one axial end by the annular groove 38 of the secondary piston 22 and at the other axial end by the secondary pressure chamber delimiting flange 37. With regard to the radial direction, the secondary pressure chamber 25 is delimited both by an axial wall section of the annular groove 38 and by the axial section of the secondary pressure chamber delimiting flange 37.

In the following, an exemplary embodiment of the method according to the disclosure is explained with reference to the torque-distribution device 1 shown in FIGS. 1 and 2. The method relates to the transfer of the multiple disc clutch or clutch device 5, 6 from the release position, in which the disc packs 7 and 9 or 8 and 10 are not in frictional engagement, to a sensing position, in which the disc packs 7 and 9 or 8 and 10 are in frictional engagement. The individual method steps are explained with reference to FIGS. 5 to 8, each of which corresponds to FIG. 2.

FIG. 5 shows the torque-distribution device 1 in the release position. Here, the primary piston 21 does not press on the disc packs 8, 10, so that the multiple disc clutch or the clutch device 6 is not in frictional engagement. Both pressure chambers 24, 25 are not pressurized, which is indicated by the dotted area. The second spring element 32 pushes the secondary piston 22 away from the support flange 33, so that the primary piston 21 is also pulled away from the disc packs 8, 10 by means of the secondary piston 22. Both pistons 21, 22 are then in a right stop position with respect to FIG. 5.

FIG. 6 shows the torque-distribution device 1 if a control signal indicating the transfer of the clutch device 6 to the sensing position is present. In this case, the pressure in the secondary pressure chamber 22 is first increased, as indicated by the dashed area. The application of pressure to the pressure medium in the secondary pressure chamber 23 causes the secondary piston 22 to be displaced to the left up to a stop position (see FIG. 7) in which it abuts against the support flange 33. In the process, the primary piston 21 is also moved to the left in the direction of the disc packs 8, 10 and in contact with them via the first spring element 31, so that the release clearance is overcome very quickly.

As soon as the secondary piston 22 has reached the stop position shown in FIG. 7 with respect to the support flange 33 or already at the same time as pressure is applied to the secondary pressure chamber 25, pressure is also applied to the primary pressure chamber 24 in order to press the primary piston against the disc pack and compress it and bring it into frictional contact or maximum frictional engagement until a desired final pressure is present in the primary pressure chamber 24. FIG. 7 shows the situation in which the final pressure in the primary pressure chamber 24 has not yet been reached, which is indicated by the dash-dotted area. The increase in pressure in the situation shown in FIG. 7 in the primary pressure chamber 24 causes the primary piston to move even further to the left against the disc pack 8, 10, wherein the first spring element 31 connected to the primary piston expands against its elastic restoring force, i.e., it is tensioned.

FIG. 8 shows the torque-distribution device 1, provided that the transfer of the clutch device 6 to the sensing position has been completed. The pressure in the primary pressure chamber 24 has reached the desired final pressure (see dashed area in the primary pressure chamber 24), which is required for the friction-induced torque transmission between the disc packs 8, 10. The application of pressure in the primary pressure chamber 24 causes the first elastic spring element 31, i.e., the bellows, which delimits the primary pressure chamber 24 to the outside, to expand against an elastic restoring force.

The transfer of the multiple disc clutch from the sensing state to the release state is described below. Based on the situation shown in FIG. 8, a control signal indicating the corresponding transfer causes the primary pressure chamber 24 to be relieved of pressure. The tensioned first elastic spring element 31 causes the primary piston 21 to be pulled to the right or away from the disc packs 8, 10 immediately upon this pressure relief as a result of the relaxation of the first spring element 31, so that when this signal is present, the frictional engagement of the multiple disc clutch is canceled practically without a time delay. As there is also no application of pressure in the secondary pressure chamber 25, the secondary piston 22 is moved to the right by means of the second spring element 32. Both spring elements 31, 32 therefore cause the torque-distribution device 1 to switch from the sensing position to the release position without delay.

REFERENCE NUMERALS

1 Torque-distribution device
2 Rotor carrier
3 Shaft
4 Rotation axis
5, 6 Clutch devices
7, 8 Outer disc packs
9, 10 Inner disc packs
11, 12 Inner multiple disc carrier
13, 14 Hub flange
15, 16 Output shaft
17, 18 Axial toothing
19, 20 Actuation devices
21 Primary piston
22 Secondary piston
23 Retaining element
24 Primary pressure chamber
25 Secondary pressure chamber
26 Primary feed line
27 Secondary feed line
28 Pressure medium conveying device
29 Common feed line
30 Valve device
31 First spring element
32 Second spring element
33 Support flange
34 Radial secondary piston section
35 Axial secondary piston section
36 Support flange sealing element
37 Secondary pressure chamber delimiting flange
38 Annular groove
39 Delimiting flange sealing element

The invention claimed is:

1. A torque-distribution device comprising a rotor carrier that is coupled or can be coupled to a shaft introducing the torque, and two separate clutch devices, each designed as a multiple disc clutch, which can be actuated separately via a respective actuation device, wherein each clutch device comprises an outer disc pack arranged in an axially displaceable manner on the rotor carrier and an inner disc pack arranged in an axially displaceable manner on a separate inner multiple disc carrier and which engages in the outer disc pack, which forms a disc pack with the outer disc pack, wherein each inner multiple disc carrier is coupled or can be coupled to a separate output shaft, wherein each actuation device comprises a primary piston, a secondary piston and a retaining element which is stationary with respect to the rotor carrier, on which the primary piston and the secondary piston are each arranged in an axially displaceable manner, wherein the primary piston delimits a primary pressure chamber and can be moved against the outer disc pack when pressure is applied to a pressure medium arranged in the primary pressure chamber, so that it is moved against the inner disc pack in such a way that a torque can be transmitted from the shaft to the output shaft and vice versa as a result of friction between the outer disc pack and the inner disc pack caused by the pressure force, wherein the secondary piston delimits a secondary pressure chamber and, when pressure is applied to the pressure medium or a pressure medium located in the secondary pressure chamber, can be moved such that it moves the primary piston against the outer disc pack, wherein the primary pressure chamber and the secondary pressure chamber can each be supplied with a pressure medium in each case via separate feed lines and independently of one another, and thus pressure can be applied to the primary piston and the secondary piston independently of one another, and wherein:

the primary pressure chamber has a larger filling volume for the pressure medium than the secondary pressure chamber; or a primary piston pressure area of the primary piston delimiting the primary pressure chamber is larger than a secondary piston pressure area of the secondary piston delimiting the secondary pressure chamber.

2. The torque-distribution device according to claim 1, wherein
the primary piston and the secondary piston are connected to one another via a first spring element, or
a second spring element is provided, which is supported on the one hand on a section that is stationary with respect to the axially displaceable pistons and on the other hand on the secondary piston.

3. The torque-distribution device according to claim 2, wherein
the first spring element is or comprises at least one coil spring or a disc spring or is a bellows, or the second spring element is or comprises a coil spring or a disc spring.

4. The torque-distribution device according to claim 1, wherein
the secondary piston comprises a radial secondary piston section and an axial secondary piston section adjoining it.

5. The torque-distribution device according to claim 4, wherein
a first spring element is arranged at the end of the axial secondary piston section opposite the radial secondary piston section or forms the axial secondary piston section.

6. The torque-distribution device according to claim 4, wherein
the axial secondary piston section engages around a support flange extending between the primary piston and the secondary piston and from the retaining element, which delimits the primary pressure chamber, in such a way that the axial secondary piston section slides along the radial end of the support flange.

7. The torque-distribution device according to claim 4, wherein
the secondary pressure chamber is delimited by a secondary pressure chamber delimiting flange which is stationary with respect to the axially displaceable secondary piston and is fastened to the retaining element, wherein the radial secondary piston section has an axially open annular groove delimiting the secondary pressure chamber, wherein the secondary pressure chamber delimiting flange engages axially in the annular groove and slides in a fluid-tight manner along a surface of the annular groove with a delimiting flange sealing element during the axial displacement of the secondary piston.

8. A method for operating a torque-distribution device according to claim 1,
wherein
each of the multiple disc clutches is transferred from a release position, in which it is open, to a sensing position, in which it is closed, due to pressure being applied to the pressure medium arranged in the secondary pressure chamber before or at the same time as pressure is applied to the pressure medium arranged in the primary pressure chamber.

9. A torque-distribution device comprising:
a rotor carrier couplable to an input shaft;
a clutch device comprising a disc pack, the disc pack comprising an outer disc pack rotatable with the rotor carrier and an inner disc pack rotatable with an inner multiple disc carrier; and
an actuation device for actuating the clutch device, the actuation device comprising:
a retaining element arranged stationary to the rotor carrier;
a primary piston arranged on and axially displaceable relative to the retaining element, the primary piston delimiting a primary pressure chamber and movable against the disc pack to frictionally connect the input shaft to an output shaft when pressure is applied to a pressure medium arranged in the primary pressure chamber; and
a secondary piston arranged on and axially displaceable relative to the retaining element, the secondary piston delimiting a secondary pressure chamber and movable to move the primary piston against the disc pack when pressure is applied to a pressure medium arranged in the secondary pressure chamber; and
a first spring element, wherein:
the pressure medium arranged in the primary pressure chamber is supplied by a first feed line and the pressure medium arranged in the secondary pressure chamber is supplied by a second feed line, independent of the first feed line, such that pressure can be applied to the primary piston and to the secondary piston independently;
the primary piston and the secondary piston are connected to one another via the first spring element; and
the first spring element is or comprises at least one coil spring or disc spring, or is a bellows.

10. The torque-distribution device of claim 9, wherein:
the primary pressure chamber has a larger filling volume for the pressure medium than the secondary pressure chamber; or
the primary piston comprises a primary piston pressure area delimiting the primary pressure chamber;
the secondary piston comprises a secondary piston pressure area delimiting the secondary pressure chamber; and
the primary piston pressure area is larger than the secondary piston pressure area.

11. The torque-distribution device of claim 9, wherein:
the actuation device further comprises a second spring element supported between a stationary section and the secondary piston; and
the second spring element is or comprises a coil spring or a disc spring.

12. The torque-distribution device of claim 9, wherein the secondary piston comprises a radial secondary piston section and an axial secondary piston section adjoining it.

13. A torque-distribution device comprising:
a rotor carrier couplable to an input shaft;

a clutch device comprising a disc pack, the disc pack comprising an outer disc pack rotatable with the rotor carrier and an inner disc pack rotatable with an inner multiple disc carrier; and an actuation device for actuating the clutch device, the actuation device comprising:

a retaining element arranged stationary to the rotor carrier;

a primary piston arranged on and axially displaceable relative to the retaining element, the primary piston delimiting a primary pressure chamber and movable against the disc pack to frictionally connect the input shaft to an output shaft when pressure is applied to a pressure medium arranged in the primary pressure chamber; and a secondary piston arranged on and axially displaceable relative to the retaining element, the secondary piston delimiting a secondary pressure chamber and movable to move the primary piston against the disc pack when pressure is applied to a pressure medium arranged in the secondary pressure chamber; and the pressure medium arranged in the primary pressure chamber is supplied by a first feed line and the pressure medium arranged in the secondary pressure chamber is supplied by a second feed line, independent of the first feed line, such that pressure can be applied to the primary piston and to the secondary piston independently, wherein;

the secondary piston comprises a radial secondary piston section and an axial secondary piston section adjoining it, the actuation device further comprises a first spring element, and the first spring element is arranged at an end of the axial secondary piston section opposite the radial secondary piston section; or the first spring element forms the axial secondary piston section.

14. The torque-distribution device of claim 13, wherein:

the actuation device further comprises a support flange extending from the retaining element between the primary piston and the secondary piston, delimiting the primary pressure chamber and comprising a support flange sealing element at a radial end; and the axial secondary piston section engages around the support flange in such a way that the axial secondary piston section slides along the support flange sealing element in a fluid-tight manner.

15. The torque-distribution device of claim 13, wherein:

the actuation device further comprises a delimiting flange that delimits the secondary pressure chamber, the delimiting flange comprising a delimiting flange sealing element and fastened to the retaining element;

the radial secondary piston section comprises an axially open annular groove delimiting the secondary pressure chamber; and the delimiting flange sealing element engages axially in the axially open annular groove and slides in a fluid-tight manner along a surface of the axially open annular groove during axial displacement of the secondary piston.

* * * * *